United States Patent [19]

Agari

[11] Patent Number: 5,388,911
[45] Date of Patent: Feb. 14, 1995

[54] LINEAR MOTION ROLLING GUIDE UNIT

[75] Inventor: Norimasa Agari, Seki, Japan

[73] Assignee: Nippon Thompson Co., Ltd., Tokyo, Japan

[21] Appl. No.: 165,834

[22] Filed: Dec. 14, 1993

[30] Foreign Application Priority Data

Dec. 17, 1992 [JP] Japan ................. 4-91497[U]

[51] Int. Cl.⁶ ........................................ F16C 29/06
[52] U.S. Cl. .................................................. 384/15
[58] Field of Search ............. 384/15, 45, 43, 44, 384/16

[56] References Cited

U.S. PATENT DOCUMENTS

| 4,921,358 | 5/1990 | Kasuga et al. | 384/15 |
| 5,324,116 | 6/1994 | Agari | 384/15 |

FOREIGN PATENT DOCUMENTS

| 118317 | 12/1991 | Japan. |
| 121220 | 12/1991 | Japan. |
| 164128 | 6/1993 | Japan. |

*Primary Examiner*—Lenard A. Footland
*Attorney, Agent, or Firm*—Browdy and Neimark

[57] ABSTRACT

The linear motion rolling guide unit according to this invention enables the under seals to be mounted to the end seals reliably and free from deformation such as by buckling, thereby providing good sealing for relative-sliding portions at all times. The under seals are formed at both longitudinal ends with locking holes and the end seals are formed at the lower end with hook-shaped projections, each of which has a downwardly projecting portion and a bend locking portion. Mounting the under seals to the end seals is accomplished simply by fitting the hook-shaped projections of the end seals into the locking holes in the under seals, without requiring additional fastening parts.

6 Claims, 3 Drawing Sheets

LINEAR MOTION ROLLING GUIDE UNIT

BACKGROUND OF THE INVENTION

1. Field of the Invention

The present invention relates to a linear motion rolling guide unit, which is applied to a variety of relatively sliding portions in machine tools and testing equipment and in which a slider is mounted slidable on a track rail with rolling elements interposed therebetween.

2. Description of the Prior Art

In conventional linear motion rolling guide units, the sealing between a track rail and a slider that slides on it is realized by end seals attached to the ends of the slider and under seals attached to the underside of the slider.

A linear motion rolling guide unit as shown in FIG. 5 has been known. FIG. 5 shows a perspective view of one example of a conventional linear motion rolling guide unit. As shown in the figure, the linear motion rolling guide unit includes a track rail 1 having raceway grooves 9 extending longitudinally on both side wall surfaces 8 thereof, and a slider 18 slidably mounted astride on the track rail 1. The slider 18 has a casing 2, which is slidable relative to the track rail 1 and has raceway grooves 7 formed at positions facing the raceway grooves 9 on the track rail 1, a number of rolling elements 4 trapped between the opposing raceway grooves 7 and 9, and end caps 5 attached to the longitudinal ends of the casing 2, the longitudinal direction being the sliding direction of the casing 2. The end cap 5 has an end seal 27 attached to the end surface thereof that provides the sealing between the track rail 1 and the slider 18. The end cap 5 is also provided with a grease nipple 26 for supplying lubricant to the sliding surfaces between the track rail 1 and the slider 18. To prevent the rolling elements 4 from coming off the casing 2, retainer bands 24 are provided to the casing 2 in such a way as to enclose these balls 4. The under seals 3 have a function of retaining the rolling elements 4 in place and also a function of sealing the sliding portions between the casing 2 and caps 5 and the longitudinal side wall surfaces 8 of the track rail 1. For this purpose, the under seals 3 are arranged at the undersides of the casing 2 and the end caps 5.

The slider 18 is mounted astride on the track rail 1 and freely slidable relative to it through a number of rolling elements 4 circulating along the raceway grooves 9 in the track rail 1. The rolling elements 4 that travel loaded along the raceway grooves 9 of the track rail 1 are led to direction changing passages formed in the end caps 5 and further to return passages 25 formed in the upper part of the casing 2 parallel to the raceway grooves 7. Thus, the rolling elements 4 run endlessly through endless circulating passages. In this way, the slider 18 is allowed to slide relative to the track rail 1 by the rolling elements 4 traveling loaded between the raceway grooves 7 on the slider 18 and the raceway grooves 9 on the track rail 1.

The under seal 3, though it has an advantage of being thin and simple in construction and easily manufactured, also has drawbacks that because the under seal 3 is thin, it is easily deformed by external forces and by positioning errors between it and the casing 2 and track rail 1, the casing and track rail having the raceway grooves 7, 9 respectively.

In an under seal apparatus for a linear motion guide bearing disclosed in the Japanese Utility Model 118317/1991, axial ends of the under seal are formed with axially extending projections and end seals are formed at their bottom end surfaces with engagement holes for receiving the projections of the under seal, whereby the under seal is fitted into the end seals having a greater strength to make mounting and dismounting easy and to secure a sufficient strength.

In another under seal apparatus for a linear motion guide bearing disclosed in the Japanese Utility Model 121220/1991, the axial ends of the under seal are provided with two-pronged projections protruding toward the underside of the slider, the two prongs diverging in a V-shape and being elastically deformable toward each other. The slider has the axial end portions of the underside thereof formed with vertical holes, into which the two-pronged projections of the under seal are fitted, and also with through-holes that intersect the vertical holes perpendicularly and pass through the arm or wing portions of the slider. One of the two prongs fitted into the vertical hole is elastically deformed therein, urging the under seal toward the side surface of the guide rail to bring the side edge of the under seal into sliding contact with the guide rail.

In these under seal apparatuses for the linear motion guide bearings, the under seal is mounted by engaging the projections or prongs formed on the under seal into the engagement holes formed in the slider or and seals.

The conventional linear motion rolling guide units, however, uses different materials for the dust prevention member and the slider, so that they have different thermal expansions as temperature changes. When the thermal expansion of the dust prevention member becomes larger than that of the slider, the dust prevention member will be deflected creating a gap between it and the guide rail or the underside of the casing, with the result that the sealing performance deteriorates, unable to prevent ingress of dust.

To solve the above drawback, the applicant of this invention developed a linear motion rolling guide unit and applied for patent previously (Japanese Patent Laid-Open No. 164128/1993). In this linear motion rolling guide unit, the under seal has a lip portion sealingly engageable with the undersides of the casing and the end caps and another lip portion sealingly engageable with the side wall surface of the track rail. The under seal is also formed at the longitudinal ends with locking portions, which are fitted into engagement holes formed in the end seals to mount the under seal to the end seals.

In the conventional linear motion-rolling guide unit, since the longitudinal ends of the under seal are engaged in the engagement holes formed in the end caps or end seals to mount the under seal to the end seals, there must be some play for the under seal to move relative to the undersides of the casing and end caps so that the longitudinal elongation of the under seal due to thermal expansion difference can be offset by the engagement holes in the end caps or end seals. Otherwise, the under seal would be deformed as by buckling, degrading the sealing performance.

The contentional linear motion rolling guide unit, however, has the construction in which the projections of the under seal are engaged in the engagement holes in the end caps or end seals in such a way that they cannot move in the longitudinal direction. Further, since the under seal adheres to the undersides of the casing and end caps, the under seal cannot move.

SUMMARY OF THE INVENTION

A main objective of the present invention is to solve the above-mentioned problem and to provide a linear motion rolling guide unit, which is characterized in that the under seals for sealing the undersides of the casing and end caps and the side wall surfaces of the track rail are easily mounted to the slider by inserting hook-shaped projections formed at the lower ends of the end seals attached to the end surfaces of the end caps into laterally extending, locking holes formed at both longitudinal ends of each under seal; that gaps are formed between longitudinally inner side surfaces of the locking holes in the under seals and inner side surfaces of the hook-shaped projections of the end seals, or alternatively the spring force of the end seals is applied longitudinally to the under seals to give them longitudinal tension so that the under seals can be moved longitudinally when they deform by thermal expansion or by swelling due to exposure to lubricants, thereby preventing the under seals from being deformed as by buckling or strains and ensuring good sealing performance.

Another objective of this invention is to provide a linear motion rolling guide unit, which comprises:

a track rail having raceway grooves formed on longitudinally extending side wall surfaces thereof;

a casing mounted astride on and slidable relative to the track rail and having second raceway grooves formed at positions facing the first raceway grooves on the track rail;

end caps mounted to the longitudinal ends of the casing;

rolling elements circulating through raceways formed between the facing raceway grooves; end seals attached to the end caps on the side opposite to the casing;

under seals arranged on the undersides of the casing and the end caps;

hook-shaped projections formed at the lower ends of the end seals and extending widthwise, the hook-shaped projections having downwardly projecting portions and bent locking portions, the bent locking portions being formed by bending the free ends of the downwardly projecting portions in a direction away from the end caps; and locking holes formed in the longitudinal ends of each under seal for receiving the hook-shaped projections, the locking holes receiving the downwardly projecting bent locking portions.

The under seals can be positioned in the lateral direction by the engagement between lateral side surfaces of the locking holes in the under seals and lateral side surfaces of the downwardly projecting portions of the end seals. The under seals can also be positioned in the longitudinal direction by the engagement between longitudinally outer side surfaces of the locking holes and longitudinally outer side surfaces of the downwardly projecting portions of the end seals.

In this linear motion rolling guide unit, the under seals are mounted to the end seals in the following manner. One of the end seals is placed on the end surface of one of the end caps. Then the hook-shaped projections at the lower end of the end seal are inserted into the locking holes at one end of the under seals. After this, the under seals are turned until they engage with the undersides of the casing and the end caps. Next, the hock-shaped projections at the lower end of the other end seal are fitted into the locking holes at the other end of the under seals, and the second end seal is turned until it engages with the end surface of the second end cap. The end seals are then fixed, along with the end caps, to the casing by mounting bolts that reach the casing. When the slider is mounted on the track rail, the under seals firmly attached to the undersides of the casing and the end caps now engage with the side wall surfaces of the track rail, sealing the sliding portions between the track rail and the slider. In this way, the linear motion rolling guide unit of this invention does not require additional fixing parts in mounting the under seals to the end seals and permits positioning in all directions of the under seals only by engagement between the hook-shaped projections of the end seals and the locking holes in the under seal.

Assembling the under seals to the slider is accomplished by inserting the hook-shaped projections formed on the end seals into the locking holes formed in the longitudinal ends of the under seals. This assembly gives the bent locking portions of the hook-shaped projections formed on the end seals the functions of supporting the under seals and of securing them to the end seals. It is thus possible to mount the under seals to the end seals easily without requiring a troublesome operation of positioning the under seal with respect to the end seals and without requiring additional fastening parts. This construction also facilitates the replacement of the under seals and assures reliable and easy assembly to the slider.

When the under seals elongate greatly by thermal expansion or by swelling due to exposure to lubricant, this elongation is offset by gaps formed between longitudinally inner side surfaces of the locking holes in the under seals and inner side surfaces of the hook-shaped projections of the end seals. That is, when the under seals increase in length due to swelling or thermal expansion difference, the longitudinal elongation of the under seals is offset by the engaged relationship between the locking holes in the ends of the under seals and the downwardly projecting portions of the end seals fitted into the locking boles. In other words, the elongation is offset by the tension of the under seals which is constantly applied by the spring force of the hook-shaped projections of the end seals. Hence, the under seals are prevented from getting deformed as by buckling, maintaining good sealing performance.

Further, when the longitudinal length of locking holes in the under seals is smaller than the thickness of the downwardly projecting portions of the end seals, the under seal can have a longitudinally outward tension (or preloading) applied thereto by the spring force of the end seal to which the under seal is attached. Therefore, when the under seals extend by swelling or thermal expansion difference, their elongation is smoothly offset and they can keep the good sealing for the undersides of the casing and the end caps.

Another notable aspect of this invention is that the under seals are resiliently held between the lower end surfaces of the end seals and the upper surfaces of the bent locking portions by the spring force of the bent locking portions and that gaps are formed between the side surface of each locking hole on the side opposite to the track rail and the facing side surface of each downwardly projecting portion of the hook-shaped projections so as to allow the under seal to move in the lateral direction. Thus, not only are the under seals firmly held by the spring force of the end seals, but as the lip portions of the under seals that are in sliding contact with the side wall surfaces of the track rail are worn over a long period of use, the under seals can also be moved toward the track rail by a distance corresponding to the amount of wear in the lip portions. In other words, the under seals can be adjusted for wear. Moreover, the wear adjustment can be made by a simple operation of pushing the under seals toward the track rail from laterally outside.

DETAILED DESCRIPTION OF THE EMBODIMENT

Figure 1:
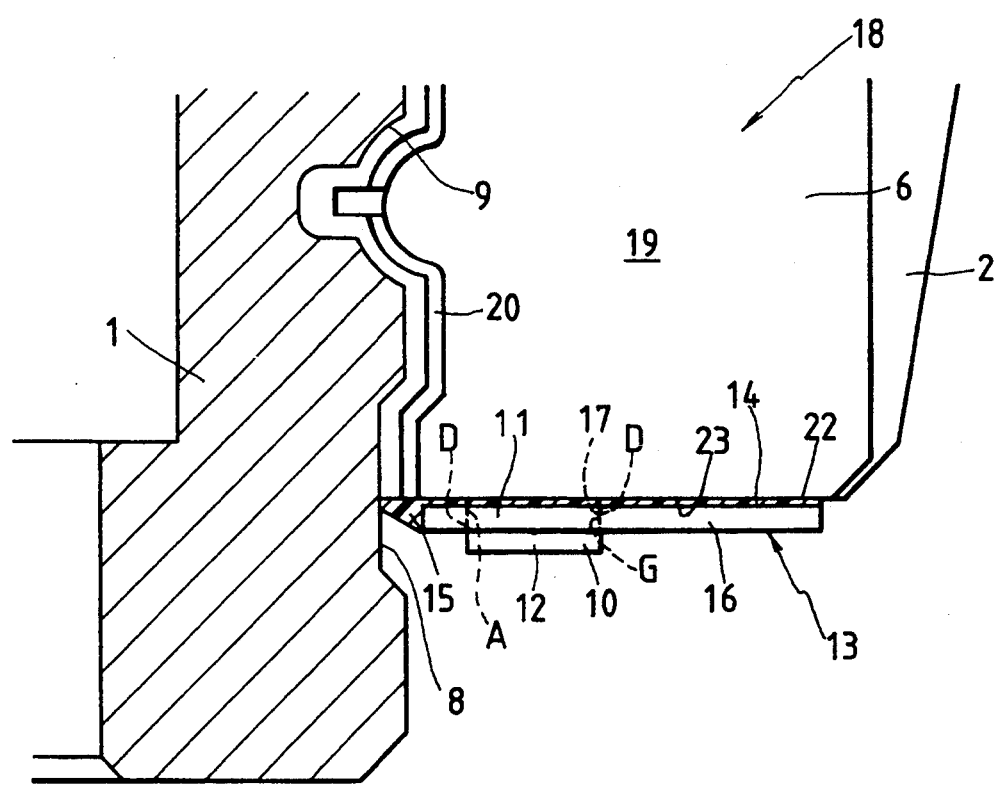
FIG. 1 is a schematic end view showing a part of the linear motion rolling guide unit as one embodiment of the present invention.
Figure 2:
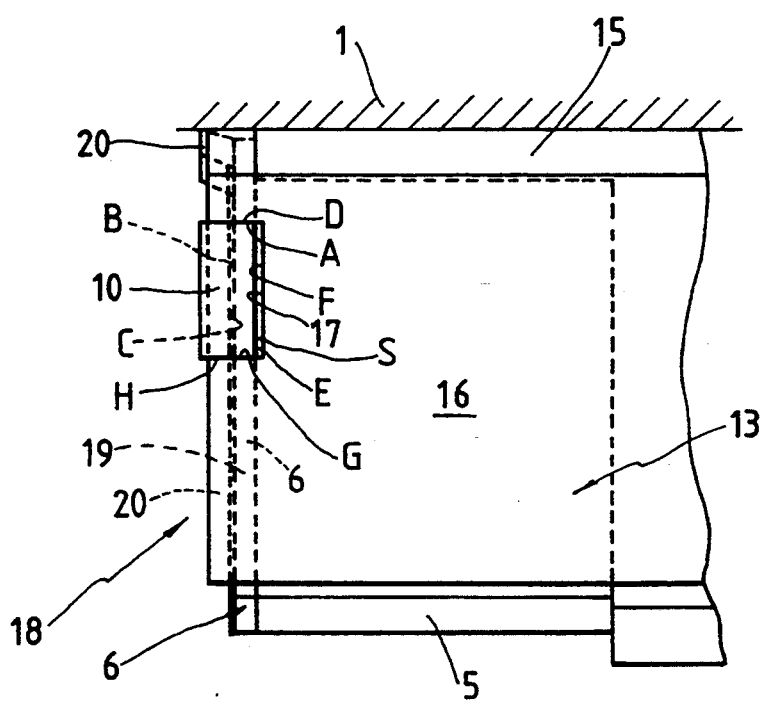
FIG. 2 is a bottom view showing a part of the linear motion rolling guide unit of FIG. 1.
Figure 3:
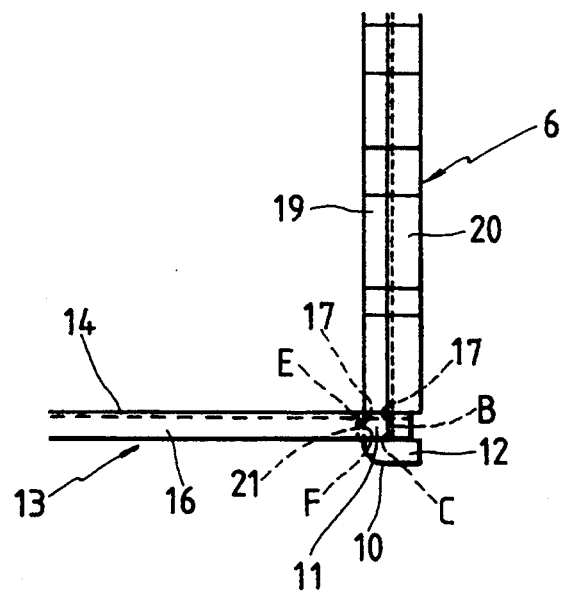
FIG. 3 is an inner side view showing the under seal and the end seal of the linear motion rolling guide unit of FIG. 1 in their locked condition.
Figure 4:
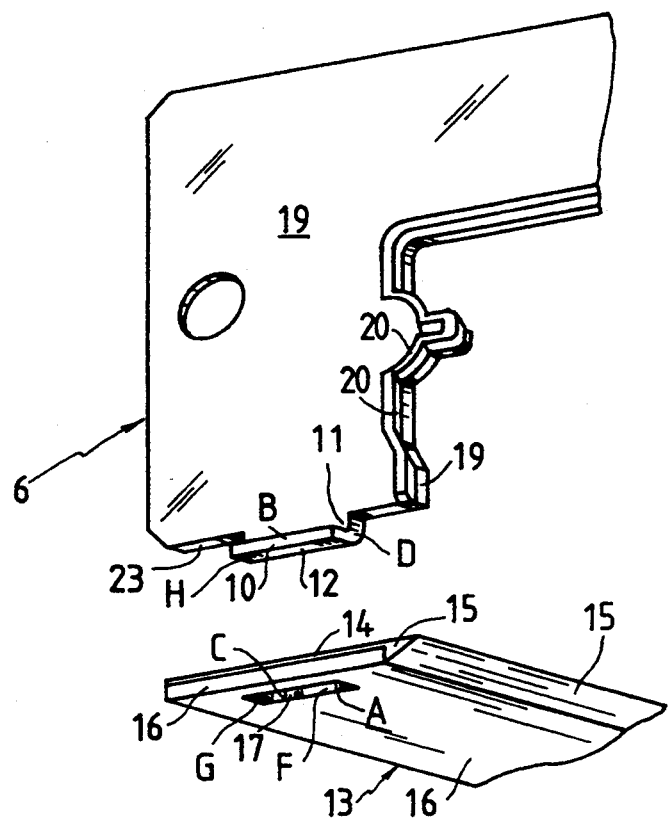
FIG. 4 is an exploded perspective view showing the locking portions of the under seal and the end seal in the linear motion rolling guide unit of FIG. 1.

Now, one embodiment of the linear motion rolling guide unit according to this invention will be described by referring to FIGS. 1, 2, 3 and 4. In these figures components having the same functions or actions as those in FIG. 5 are assigned like reference numerals.

Figure 5:
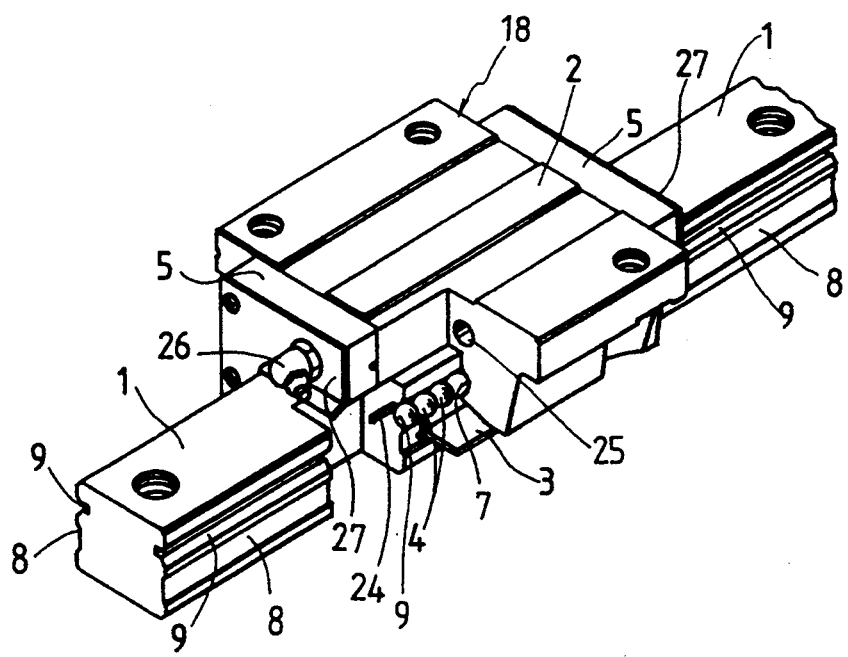
FIG. 5 is a perspective view of one example of a conventional linear motion rolling guide unit.

The linear motion rolling guide unit of this invention is basically the same in construction as the linear motion rolling guide unit of FIG. 5 and is characterized in the shape and mounting structure of the under seal and the end seal. That is, like the construction shown in FIG. 5, the linear motion rolling guide unit of this invention comprises: a track rail 1 having raceway grooves 9 extending longitudinally on both side wall surfaces 8 thereof; and a slider 18 slidable relative to the track rail 1. The slider 18 includes a casing 2 slidable relative to the track rail 1 and having raceway grooves 7 at positions facing the raceway grooves 9; rolling elements 4 circulating through raceways formed between the opposing raceway grooves 7 and 9 to allow relative motion between the slide and the track rail; end caps 5 attached to the longitudinal ends of the casing 2; end seals 6 attached to the end surfaces of the end caps 5; and under seals 13 mounted to the end seals 6.

The under seal 13 that seals the relative sliding portions of the track rail 1 and the slider 18 comprises a core member 16 made of such metallic materials as steel and a seal member 14 made of such elastic materials as rubber and plastics secured to the core member. The seal member 14 has a lip portion 15 in contact with the side wall surface 8 of the track rail 1 to provide a sealing condition and also an engagement surface 22 that contacts the undersides of the casing 2 and the end caps 5 to provide a sealing condition.

This linear motion rolling guide unit is characterized in that the under seal 13 is attached to the end seals 6 in order to be assembled to the slider 20. For this purpose, the end seal 13 is provided at its longitudinal ends with locking holes 17 that extend widthwise. The end seal 6 includes a metal plate 19 made of such metallic materials as steel and a seal member 20 made of such elastic materials as rubber and plastics secured to the edge of the metal plate 19 on the track rail 1 side. The end seal 6 is formed at its lower end with a hook-shaped projection 10 that extends widthwise. The hook-shaped projection 10 consists of a projecting portion 11 extending downward and a bent locking portion 12 formed at the end of the projecting portion 11 and bent in a direction opposite to the end cap 5.

The under seal 13 may be mounted to the end seals 6, for example, in the following procedure.

First, one of the end seals 6 is placed on the end surface of one of the end caps 5 and secured to the casing 2 by mounting bolts (not shown). After this, the hook-shaped projections 10 at the lower end of the end seal 6 are fitted into the locking holes 17 of the under seals 13. The under seals 13 are then turned, say, 90 degrees until they engage with the undersides of the casing 2 and the end cap 5. As a result, the bent locking portions 12 of the hook-shaped projections 10 formed on the end seal 6 are locked by the locking holes 17 formed in the under seals 13, with the downwardly extending projecting portions 11 engaged in the locking holes 17. At this time, because the under seals 13 bear tightly on the undersides of the casing 2 and the end cap 5, the bent locking portions 12 of the hook-shaped projections 10 formed on the end seal 6 support the under seals 13.

Next, the hook-shaped projections 10 at the lower end of the end seal 6 are fitted into the other locking holes 17 of the under seals 13, and the end seal 6 is turned, say, 90 degrees until it engages with the end surface of the end cap 5. As a result, the bent locking portions 12 of the hook-shaped projections 10 of the end seal 6 are locked by the second locking holes 17 formed in the under seals 13, with the downwardly projecting portions 11 engaged in the locking holes 17. The end seal 6 is then fixed, along with the end cap 5, to the casing 2 by mounting bolts (not shown) that reach the casing 2.

In the same way as above, with the under seals 13 kept in close contact with the undersides of the casing 2 and the end cap 5, the other locking holes 17 of the under seals 13 are locked on the bent locking portions 12 of the hook-shaped projections 10 formed on the other end seal 6 so that the bent locking portions 12 support the under seals 13. Then, the other end seal 6 is fixed, along with the other end cap 5, to the casing 2 by mounting bolts (not shown) that reach the casing 2. When the slider is mounted on the track rail 1, the under seals 13 that are firmly attached to the undersides of the casing 2 and the end caps 5 now engage with the side wall surfaces 8 of the track rail 1, sealing the circulation passages of the rolling elements 4. In this way, the linear motion rolling guide unit of this invention does not require additional fastening parts in mounting the under seals 13 to the end seals 6 and permits positioning in all directions of the under seals 13 only by engagement between the hook-shaped projections 10 of the end seals 6 and the locking holes 17 in the under seal 13.

In this linear motion rolling guide unit, the hook-shaped projections 10 of the end seals 6 are preferably made of highly elastic materials such as spring steel to keep the under seals 13, when attached to the end seals 6, tensed (preloaded) in a longitudinal direction by the spring force of the end seals 6. The under seals 13 can be positioned in a lateral direction by the engagement between a lateral side surface A of the locking hole 17 in the under seal 13 and a corresponding lateral side surface D of the projecting portion 11 of the hook-shaped projection 10 formed on the end seal 6. The under seals 13 can also be positioned in a longitudinal direction by the engagement between a longitudinally outer side surface C of the locking hole 17 in the under seal 13 and a corresponding, longitudinally outer side surface B of the projecting portion 11. A gap S is formed between a longitudinally inner side surface F of the locking hole 17 in the under seal 13 and a facing longitudinally inner side surface E of the projecting portion 11 of the end seal 6.

In the above embodiment, the lateral length of the projecting portion 11 of the end seal 6 is almost equal to that of the locking hole 17 in the under seal 13 so that the under seal 13, when mounted to the side seals 6, is reliably positioned widthwise.

The distance between the paired projecting portions 11 of the end seal may be set shorter than that between the locking holes 17 in the paired under seals 13 to form a gap between a side surface G of the locking hole 17 on the side opposite to the track rail 1 and a facing side surface H of the projecting portion 11 of the hook-shaped projection 10 to allow the under seal 13 to move in the lateral direction. Then, the under seals 13 are elastically held between the bottom surfaces 23 of the end seals 6 and the top surfaces of the bent locking portions 12 by the spring force of the bent locking portion 12. Using the elasticity of the bent locking portions 12, the under seals 13 are mounted to the end seals 6. This construction permits the under seals 13 to move in the lateral direction. .Therefore, when the lip portion 15 of the under seal 13 that slides in contact with the side wall surface 8 of the track rail 1 becomes worn out over a long period of use, it is possible to move the under seal 13 toward the track rail 1 by a distance corresponding to the amount of wear of the lip portion 15. In other words, the under seal 13 can be adjusted for wear. After the wear adjustment has been made, a filling member such as a shim may be fitted into the gap. The filling member may be varied in its thickness according to the amount of wear of the lip portion 15 of the under seal 13.

The linear motion rolling guide unit of this invention is constructed as described above. It is noted, however, that the invention is not limited to the above embodiment alone and that various modifications may be made. In FIG. 1, the lip portion 15 is shown to be provided only on the side that contacts the side wall surface 8 of the track rail 1. In a construction in which the core member 16 is in contact with the casing 2 and the end caps 5 and in which the seal member 14 is arranged on the underside of the core member 16, however, it is possible to provide a lip portion on the side opposite to the track rail so that it engages with the undersides of the casing 2 and the end caps 5. While the under seal 13 is shown in the above embodiment to be flat as a whole, it is possible to incline the lip portion 15 or form the lip portion on the side opposite to the track rail at a position lower than the central portion of the under seal. Further, while the above embodiment has only one hook-shaped projection 10 formed on each side of the end seal 6 and the corresponding one locking hole 17 formed at each end of the under seal 13, it is possible to provide two or more hook-shaped projections and form the corresponding number of locking holes in each end of the under seal.

I claim:

1. A linear motion rolling guide unit comprising:

a track rail having first raceway grooves formed on longitudinally extending side wall surfaces thereof;

a casing mounted astride on and slidable relative to the track rail and having second raceway grooves formed at positions facing the first raceway grooves;

end caps mounted to the longitudinal ends of the casing;

rolling elements circulating through raceways formed between the first raceway grooves and the second raceway grooves;

end seals attached to the end caps on the side opposite to the casing;

under seals arranged on the undersides of the casing and the end caps, the under seals including seal members for sealing the casing, the end caps and the track rail and core members secured to the seal members;

hook-shaped projections formed at the lower ends of the end seals and extending widthwise, the hook-shaped projections having downwardly projecting portions and bent locking portions, the bent locking portions being formed by bending the free ends of the downwardly projecting portions in a direction away from the end caps; and locking holes formed in the longitudinal ends of the core member of each under seal for receiving the hook-shaped projections, the locking holes receiving the downwardly projecting portions of the hook-shaped projections to lock the bent locking portions.

2. A linear motion rolling guide unit according to claim 1, wherein the under seals are positioned with respect to the end seals in the lateral direction by the engagement between lateral side surfaces of the locking holes in the under seals and lateral side surfaces of the downwardly projecting portions of the end seals.

3. A linear motion rolling guide unit according to claim 1, wherein the under seals are positioned with respect to the end seals in the longitudinal direction by the engagement between longitudinally outer side surfaces of the locking holes in the under seals and longitudinally outer side surfaces of the downwardly projecting portions of the end seals.

4. A linear motion rolling guide unit according to claim 1, wherein the under seals are tensed in the longitudinal direction by the elasticity of each of the hook-shaped projections of the end seals.

5. A linear motion rolling guide unit according to claim 1, wherein gaps are formed between longitudinally inner side surfaces of the locking holes in the under seals and inner side surfaces of the downwardly projecting portions of the end seals to allow for elongation of the under seals.

6. A linear motion rolling guide unit according to claim 1, wherein the under seals are held elastically between the lower end surfaces of the end seals and the upper surfaces of the bent locking portions by spring force of the bent locking portions, and wherein gaps are formed between the side surfaces of the locking holes in the under seals on the side opposite to the track rail and the side surfaces of the bent locking portions on the same side to allow the under seals to be moved in the lateral direction.

* * * * *